United States Patent Office 2,874,135
Patented Feb. 17, 1959

2,874,135

GLASS COATING COMPOSITIONS

Francis G. A. de Monterey, Troy, N. Y., assignor to General Electric Company, a corporation of New York No Drawing. Application November 20, 1957
Serial No. 697,516

5 Claims. (Cl. 260—18)

This invention is concerned with a composition of matter useful for treating glass fibers and glass cloth. More particularly, the invention is concerned with a glass fiber treating composition comprising, by weight, (1) from 50 to 60 percent of a methylpolysiloxane fluid containing an average of from 1.95 to 2.1 methyl groups per silicon atom and having a viscosity of from 10 to 1000 centistokes when measured at 25° C., (2) from 1 to 10 percent of a methylpolysiloxane having an average of more than two methyl groups per silicon atom and having a viscosity of from 50,000 to 2,000,000 centistokes when measured at 25° C., (3) from 0 to 10 percent of a fluid methylpolysiloxane resin having a ratio of from 1.2 to 1.7 methyl groups per silicon atom and composed essentially of $CH_3SiO_{3/2}$, $(CH_3)_2SiO$ and $(CH_3)_3SiO_{1/2}$ groups, (4) from 1 to 15 percent of a finely divided silica and (5) from 1 to 10 percent of a dimerized linoleic acid.

One of the objects of this invention is to prevent the alkali migration from the content of leachable Na—Ca, etc. of glass fibers.

Another object of the invention is to prevent external alkali attacks on glass fibers and on glass cloth.

A still further object of the invention is to lubricate the glass fibers and to improve their flexing and abrasion resistance.

Another object of the invention is to improve the water-repellency of glass fibers, particularly of glass fibers which are to be used in the manufacture of glass cloth.

Other objects of the invention will become apparent from the disclosure thereof.

Inexpensive grades of glass fiber which are presently being manufactured are essentially Na—Ca compositions and in themselves are strongly alkaline. They are usually found to contain sodium, potassium, calcium and magnesium ions; typical is one containing calcium ion, sodium ion, magnesium ion and potassium ion, in the form of oxides and silicates of these ions. Further descriptions of such glasses can be found in Encyclopedia of Chemical Technology, volume 9, pages 122–132, and volume 13, pages 849–856, published by Interscience Encyclopedia, Inc., 1952, which by reference are made part of the disclosures herein. Under the influence of a moist atmosphere, such fibers which are used in insulating piles, for example, in the form of glass wool batting for roof insulation, will eventually be decomposed as alkali is leached out and migrates toward the glass surface. The caustic which comes to the surface tends to corrode or attack any materials, such as copper tubing in refrigerators, with which it may come in contact.

Various methods have been suggested for preventing the above leaching and migration of alkali ions in connection with the less expensive grades of glass fiber. Thus, although various materials have obviated each of the problems separately, no one treating composition has been found which accomplishes all the objectives. Where one treating composition will delay the migration of the alkali ions to the surface, it will not water-proof the glass fibers to prevent external alkali attacks. As far as lubricity and abrasion resistance of the fiber is concerned, this has required separate treatment in the past in order that a heat-stable coating on the fiber surface is obtained and one which provides good slippage and abrasion resistance. Different types of materials (e. g., phenolic resins, petroleum oils, etc.) have been employed in order to solve the above requirements for a satisfactory glass fiber of the sodium-calcium composition class. However, up to the present, no one composition has satisfactorily been used for all these various defects inherent in the present-day manufacture of glass fibers of the above type.

I have now discovered that a combination of ingredients of particular ranges and formulations can be used to treat glass fibers which consist essentially of sodium-calcium compositions and by means of treatment of the fibers with this particular composition, the surface migration of alkali ions is substantially retarded and delayed, the glass fibers are rendered waterproof and the lubricity and abrasion resistance of the fibers greatly improved, and finally external alkali attack is materially retarded. The composition used for the above fibers is one comprising, by weight, (1) from 50 to 60 percent of a methylpolysiloxane fluid containing an average of from 1.95 to 2.1 methyl groups per silicon atom and having a viscosity of from 10 to 1000 centistokes when measured at 25° C., (2) from 1 to 10 percent of a methylpolysiloxane having an average of more than two methyl groups per silicon atom and having a viscosity of from 50,000 to 2,000,000 centistokes when measured at 25° C., (3) from 0 to 10 percent of a fluid methylpolysiloxane resin having a ratio of from 1.2 to 1.7 methyl groups per silicon atom and being composed essentially of $CH_3SiO_{3/2}$, $(CH_3)_2SiO$ and $(CH_3)_3SiO_{1/2}$ groups, (4) from 1 to 15 percent of a finely divided silica and (5) from 1 to 10 percent of a dimerized linoleic acid.

The methylpolysiloxane fluid having the viscosity of from 10 to 1000 centistokes when measured at 25° C. is one which has a general formula $(CH_3)_mSiO_{(4-m)}$ where $m$ is a number ranging from 1.95 to 2.1. These methylpolysiloxane fluids may be of the chain-stopped variety (where the ratio of methyl groups to silicon is in excess of two), for instance, compositions disclosed and claimed in Patnode U. S. Patents 2,469,888 and 2,469,890. They may also be obtained by cohydrolyzing, for instance, dimethyldichlorosilane, methyltrichlorosilane, and trimethylchlorosilane in such a ratio that the methyl-to-silicon ratio is within the range of 1.95 to 2.1 methyl groups per silicon atom.

The methylpolysiloxane having an average of more than two methyl groups per silicon atom and having a viscosity from 50,000 to 2,000,000 centistokes when measured at 25° C. is one of those more particularly disclosed and claimed in the above-mentioned Patnode patents. These chain-stopped methylpolysiloxanes which have the formula

I

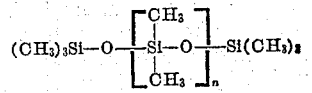

where $n$ is a whole number greater than 1, for instance, from 50 to 100,000 or more, is so chosen that the viscosity is within the range recited above.

The fluid methylpolysiloxane resin having a ratio of from 1.2 to 1.7 methyl groups per silicon atom is advantageously obtained by cohydrolyzing a blend of chlorosilanes composed, by weight, of 50 to 75 percent dimethyldichlorosilane, 1 to 10 percent trimethylchlorosilane and 10 to 35 percent methyltrichlorosilane. The usual methods for hydrolyzing mixtures of methylchlorosilane are employed and no particular problem is encountered in such hydrolysis procedures. When one cohydrolyzes the mixture of chlorosilanes within the weight ratios described above, the methylpolysiloxane thus obtained will have a ratio of methyl groups to silicon atoms within the range of from 1.2 to 1.7 methyl groups per silicon atom.

The silicas used in making the glass fiber coating compositions of the present invention may be any one of those which are sufficiently finely divided and have a particle size of a very low order. Finely divided silicas of this type are disclosed in U. S. Patent 2,541,137. Examples of such finely divided silicas which may advantageously be employed are, e. g., fume silicas (Cab-O-Sil sold by Godfrey L. Cabot Company), precipitated silicas (for instance, HiSil sold by Columbia Southern Chemical Corporation), silica aerogel (for instance, Santocel C sold by Monsanto Chemical Company), etc.

The dimerized linoleic acid can be obtained by heating the methyl ester of linoleic acid ($C_{18}H_{32}O_2$) at a high temperature for from 8 to 20 hours. The two molecules of linoleic acid combine by a Diels-Alder reaction to form the dilinoleic acid having the formula

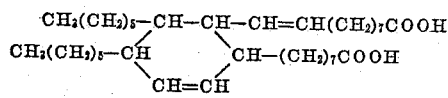

In preparing the compositions of the present invention, it is important that the finely divided silica be wet in the low viscosity methylpolysiloxane fluid (of from 10 to 1000 centistokes viscosity) before incorporation of the other ingredients. Thus, the finely divided silica filler and the low viscosity methylpolysiloxane fluid and, if desired, the higher viscosity methylpolysiloxane, specifically the methylpolysiloxane fluid having an average of more than two methyl groups per silicon atom and having a viscosity of from 50,000 to 2,000,000 centistokes, are advantageously allowed to mix together on a compounding mill, such as a colloid mill, or in a mixing tank and allowing this mixture of ingredients to mill for about 10 to 20 minutes until a homogeneous mixture of the filler and the methylpolysiloxane is obtained. Thereafter, the other components can be added in any desired sequence to obtain a composition suitable for treatment of glass fibers. Advantageously, this composition is dissolved and suspended in an inert solvent such as trichloroethylene, carbon tetrachloride, tetrachloroethane, etc., to a solids content of about 25 to 90 percent solids. This treating composition, prior to use, is then diluted with the same or other suitable solvent and dispersing phase to a solids content of about 0.1 to 10 percent, on a weight basis, and is then sprayed on the glass fibers after emerging from the spinnerettes (usually at a temperature of about 1,000° C.) to coat the glass fibers and at the same time to cool them down within a matter of just a few seconds after spraying.

If desired, the above described composition (with or without solvent) can be emulsified in water by usual techniques using available emulsifying agents such as those described in U. S. 2,798,858, Brown, assigned to the same assignee as the present invention, employing emulsification techniques also recited in said patent. The concentration of the coating composition described above in water can be varied, by weight, from 0.1 to 50 percent of the total weight of the emulsion, including the water.

The efficiency of the treating composition on the glass fibers of preventing alkali and alkaline earth oxides from being leached is determined by immersing the treated glass wool in water and checking the leaching rate for $Na^+$, $Ca^+$, $Mg^+$, $K^+$, etc., after increasing periods of time have elapsed. A high leach rate will be evidenced by the fact that the cumulative ion concentration will increase with passage of time.

In order that those skilled in the art may better understand how the present invention may be practiced, the following examples are given by way of illustration and not by way of limitation. All parts are by weight.

*Example 1*

In this example, 57.37 parts of a chain-stopped methylpolysiloxane corresponding to Formula I, having a viscosity of about 40 centistokes when measured at 25° C., was mixed with 6.74 parts of a higher viscosity methyl chain-stopped methylpolysiloxane having Formula I, but this time having a viscosity of about 200,000 centistokes when measured at 25° C. 6.74 parts finely divided fume silica (Cab-O-Sil) was mixed with the former methylpolysiloxanes on a ball mill for about 10 minutes until the filler was completely wet by the methylpolysiloxanes. Thereafter, 7.8 parts of a methylpolysiloxane resin having a ratio of from about 1.2 to 1.7 methyl groups per silicon atom and containing $CH_3SiO$ groups, $(CH_3)_2SiO$ groups, and $(CH_3)_3SiO$ groups, as well as 7.8 parts of the above-mentioned dimerized linoleic acid were added while mixing was continued on the ball mill. This mixture of ingredients was then diluted with 13.55 parts trichloroethylene to give a composition which could be used to treat glass fibers, by diluting it with additional amounts of trichloroethylene to a concentration of from 0.1 to 10 percent, solids weight, based on the total weight of the solution-dispersion.

When glass fibers emerging from the platinum bushing of a spinnerette from which the fibers were extruded at elevated temperatures (about 1000° C.) were treated with the above-described composition recited in Example 1, it was found that the percent sodium oxide ($Na_2O$) leached (as determined by the above previously recited test) was one-third of the sodium oxide leached from glass fibers which had not been treated after emerging from the spinnerette.

It will, of course, be apparent to those skilled in the art that in addition to the various methylpolysiloxanes (including fluids of higher or lower viscosity in the methylpolysiloxane resin) and in addition to the particular fume silica employed, other types of finely divided silica can be used, as well as other types of methylpolysiloxanes can be employed without departing from the scope of the invention. In addition to the silica previously described, one can also employ alkoxy-modified silicas (such as Valron Estersil sold by E. I. du Pont de Nemours and Company) as well as treated silicas, e. g., fume silica treated with octamethylcyclotetrasiloxane as is disclosed and claimed in Lucas application Serial No. 577,450, filed April 11, 1956, and assigned to the same assignee as the present invention, without departing from the scope of the invention. The proportion of ingredients can also be varied within the ranges previously recited. Other solvents of a suitable inert nature can be employed within the scope of this invention.

What I claim as new and desire to secure by Letters Patent of the United States is:

1. A composition of matter comprising, by weight, (1) from 50 to 60 percent of a methylpolysiloxane fluid containing an average of from 1.95 to 2.1 methyl groups per silicon atom and having a viscosity of from 10 to 1000 centistokes when measured at 25° C., (2) from 1 to 10 percent of a methylpolysiloxane having an average of more than two methyl groups per silicon atom and having a viscosity of from 50,000 to 2,000,000 centistokes when measured at 25° C., (3) less than 10 percent of a methylpolysiloxane resin having a ratio of from 1.2 to 1.7 methyl groups per silicon atom and containing $CH_3SiO_{3/2}$, $(CH_3)_2SiO$ and $(CH_3)_3SiO_{1/2}$ groups, (4) from 1 to 15 percent of a finely divided silica and (5) from 1 to 10 percent of a dimerized linoleic acid.

2. A composition of matter comprising a solvent and containing, by weight, (1) from 50 to 60 percent of a methylpolysiloxane fluid containing an average of from 1.95 to 2.1 methyl groups per silicon atom and having a viscosity of from 10 to 1000 centistokes when measured at 25° C., (2) from 1 to 10 percent of a methylpolysiloxane having an average of more than two methyl groups per silicon atom and having a viscosity of from 50,000 to 2,000,000 centistokes when measured at 25° C., (3) less than 10 percent of a methylpolysiloxane resin having a ratio of from 1.2 to 1.7 methyl groups per silicon atom and containing $CH_3SiO_{3/2}$, $(CH_3)_2SiO$ and $(CH_3)_3SiO_{1/2}$ groups, (4) from 1 to 15 percent of a finely divided silica and (5) from 1 to 10 percent of a dimerized linoleic acid.

3. The composition of claim 1 in which the finely divided silica is fume silica.

4. A composition of matter in the form of an aqueous emulsion containing, by weight, (1) from 50 to 60 percent of a methylpolysiloxane fluid containing an average of from 1.95 to 2.1 methyl groups per silicon atom and having a viscosity of from 10 to 1000 centistokes when measured at 25° C., (2) from 1 to 10 percent of a methylpolysiloxane having an average of more than two methyl groups per silicon atom and having a viscosity of from 50,000 to 2,000,000 centistokes when measured at 25° C., (3) less than 10 percent of a methylpolysiloxane resin having a ratio of from 1.2 to 1.7 methyl groups per silicon atom and containing $CH_3SiO_{3/2}$, $(CH_3)_2SiO$ and $(CH_3)_3SiO_{1/2}$ groups, (4) from 1 to 15 percent of a finely divided silica and (5) from 1 to 10 percent of a dimerized linoleic acid.

5. A composition of matter for treatment of glass fibers to prevent leaching and migration of alkali ions comprising an inert liquid phase and an active mixture of ingredients comprising, by weight, (1) from 50 to 60 percent of a methylpolysiloxane fluid containing an average of from 1.95 to 2.1 methyl groups per silicon atom and having a viscosity of from 10 to 1000 centistokes when measured at 25° C., (2) from 1 to 10 percent of a methylpolysiloxane having an average of more than two methyl groups per silicon atom and having a viscosity of from 50,000 to 2,000,000 centistokes when measured at 25° C., (3) less than 10 percent of a methylpolysiloxane resin having a ratio of from 1.2 to 1.7 methyl groups per silicon atom and containing $CH_3SiO_{3/2}$, $(CH_3)_2SiO$ and $(CH_3)_3SiO_{1/2}$ groups, (4) from 1 to 15 percent of a finely divided silica and (5) from 1 to 10 percent of a dimerized linoleic acid, the active mixture of ingredients comprising from 0.1 to 10 percent, by weight, based on the total weight of the latter and the inert liquid phase.

References Cited in the file of this patent

UNITED STATES PATENTS 2,660,736     Biefeld _____ Dec. 1, 1953